A. KÖNIG.
AUTOMATIC VALVE MECHANISM.
APPLICATION FILED DEC. 18, 1911.

1,031,451.

Patented July 2, 1912.

UNITED STATES PATENT OFFICE.

ADOLF KÖNIG, OF CHARLOTTENBURG, GERMANY.

AUTOMATIC VALVE MECHANISM.

1,031,451. Specification of Letters Patent. Patented July 2, 1912.

Application filed December 18, 1911. Serial No. 666,383.

*To all whom it may concern:*

Be it known that I, ADOLF KÖNIG, a subject of the German Emperor, and residing at Charlottenburg, near Berlin, Germany, have invented certain new and useful Improvements in Automatic Valve Mechanism, of which the following is a specification.

My invention relates to an automatic hydraulic valve mechanism for high pressure pipe lines for hydraulic machines, such as presses, shears and the like of variable load.

Hydraulic machines for driving lifts, cranes, presses, stages, shears, punching machines and the like are frequently driven, particularly when accumulators are employed, with a predetermined, approximately constant pressure of water. The contents of the driving cylinders are calculated for the maximum resistances to be expected, but the cylinders have also to be used for the smallest resistances, frequently with great waste of water under pressure, because the water has practically no power of expansion.

A primary object of my invention is to provide an automatic hydraulic valve mechanism by means of which these defects are obviated.

One illustrative embodiment of my invention is represented by way of example in the accompanying drawing, wherein:—

Figure 1:
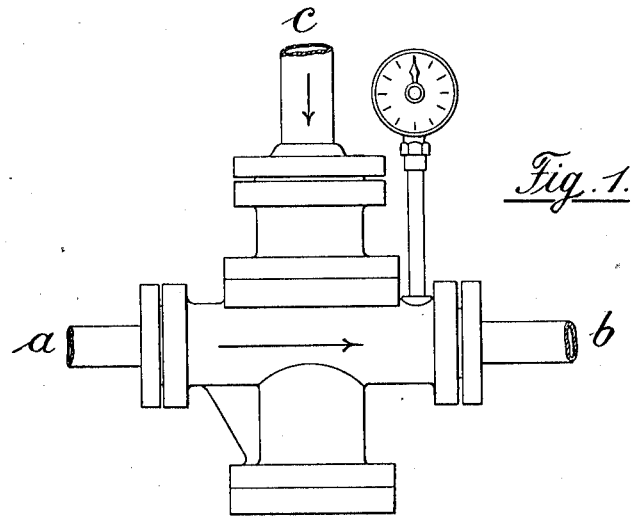
Figure 2:
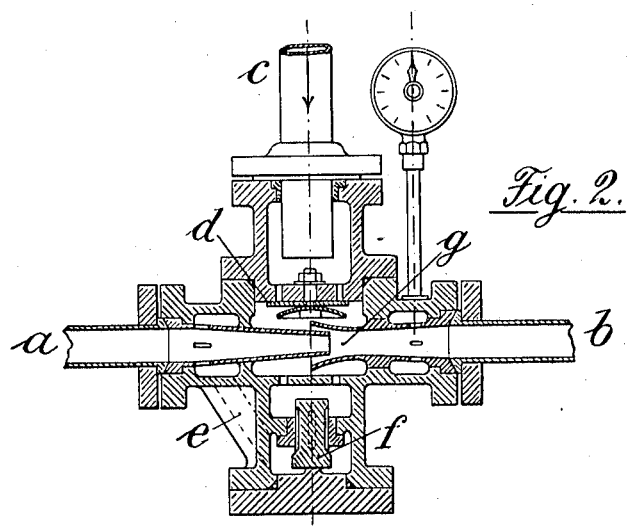

Figure 1 is an elevation and Fig. 2 a vertical section showing my improved valve mechanism.

Referring to the drawing, the valve mechanism substantially has the arrangement of an ordinary injector, the dimensions of the nozzles, however, being adapted to the high pressure and velocities of the driving water. On the way to the driving cylinder the high pressure water enters into the valve mechanism at $a$ and issues at $b$. A low pressure pipe $c$ is connected with the suction chamber of the injector by a non-return, clack or like valve $d$, and a branch pipe $e$ branching off from the high pressure pipe is connected with the suction chamber by way of a valve $f$. In the rest position of the driven machine the non-return valve $d$ of the low pressure pipe is closed by the hydraulic pressure in the suction chamber of the injector, and the valve $f$ is opened by gravity. When, after opening the controlling member located in front of or, preferably, behind the valve mechanism, the machine is to be driven, i. e. the movement of the water begins, and when the hydraulic machine is fully utilized, i. e. requires full pressure, water under pressure flows at a normal speed through the nozzle and simultaneously enters by way of the valve $f$ into the funnel $g$, in order that no lack of water occurs. But when the machine meets with less resistance when the load is more readily overcome, both the velocity of the piston in the hydraulic cylinder and, consequently, the velocity of the water in the pipe line and also in the valve $f$ of the valve mechanism increases. The suitably designed valve $f$ is closed owing to this increase in pressure and also owing to the supporting suction action of the injector. In consequence of the suction action of the injector increased by the closure of the valve $f$, however, the valve $d$ at once opens. The additional water now flowing through the latter out of the low pressure tank, not shown, connected to the pipe $c$, replaces the otherwise lacking high pressure water which previously flowed through the valve $f$, so that a quantity of high pressure water corresponding to the quantity of additional water is saved. When the counter-pressure in the hydraulic cylinder increases, on the contrary, to such an extent that the velocity of flow of the driving water and the suction action of the injector decreases, the valve $f$ opens again owing to its own weight, and the valve $d$ leading to the low pressure pipe $e$ is seated in consequence of the increased pressure of water in the suction chamber of the injector.

When the nozzles and cross-sections of the valves are correctly designed the quantities of water supplied in equal times remain always approximately the same, within certain limits, in spite of the varying pressure of water. The essential feature of the invention is the employment of the valve $f$ which, at full counter-pressure of the hydraulic working cylinder, admits of the sufficient supply of high pressure water without appreciable frictional losses arising owing to the otherwise too great velocity of the water in the nozzle.

I claim:—

1. In an automatic, hydraulic valve mechanism of the character described, the combination, with a suction chamber, a high pressure pipe opening into the same, and a high pressure pipe having a splayed end surrounding the end of the former pipe in the suction chamber, of a branch pipe branching off from the former pipe, and containing a valve, opening into the suction chamber, and a low pressure pipe, containing a valve opening into the suction chamber.

2. In an automatic, hydraulic valve mechanism of the character described, the combination, with a suction chamber, a high pressure pipe opening into the same, and a high pressure pipe having a splayed end surrounding the end of the former pipe in the suction chamber, of a branch pipe branching off from the former pipe, and containing a non-return valve, opening into the suction chamber, and a low pressure pipe, containing a non-return valve opening into the suction chamber, the arrangement being such that the latter valve is closed and the former valve is open when the resistance to the flow of the water in the pipe line is a maximum, whereas the former valve is closed and the latter valve is open when the said resistance is reduced.

In testimony whereof, I affix my signature in the presence of two witnesses.

ADOLF KÖNIG.

Witnesses:
   WOLDEMAR HAUPT,
   HENRY HASPER.

Copies of this patent may be obtained for five cents each, by addressing the "Commissioner of Patents, Washington, D. C."